United States Patent [19]

Buyssens et al.

[11] 4,064,915

[45] Dec. 27, 1977

[54] REINFORCEMENT OF RESILIENT ARTICLES

[75] Inventors: Noel Buyssens, Bossuit; Germain Verbauwhede, Zwevegem, both of Belgium

[73] Assignee: N.V. Bekaert S.A., Zwevegem, Belgium

[21] Appl. No.: 689,369

[22] Filed: May 24, 1976

[30] Foreign Application Priority Data

May 6, 1975 United Kingdom ............... 24291/75

[51] Int. Cl.² ............................................. D03D 15/02
[52] U.S. Cl. ................................. 139/425 R; 428/229; 428/256; 428/258
[58] Field of Search ....................... 139/425 R, 425 A; 428/229, 251, 256–259; 245/2, 8

[56] References Cited

U.S. PATENT DOCUMENTS

| 1,563,047 | 11/1925 | Somers | 139/425 R |
| 2,154,530 | 4/1939 | Robins | 139/425 R |
| 3,949,129 | 4/1976 | Hubbard | 139/425 R |
| 3,957,091 | 5/1976 | Buyssens et al. | 139/425 R |

FOREIGN PATENT DOCUMENTS

| 275,480 | 8/1927 | United Kingdom | 139/425 R |

Primary Examiner—James Kee Chi
Attorney, Agent, or Firm—Edward J. Brenner

[57] ABSTRACT

A woven fabric for reinforcing a resilient material, such as a tire casing, wherein the warp of the fabric consists of substantially unstranded wires held together in spaced groups by the weft of the fabric with at least some of the wires being formed with a set so as to have undulations along their length to thereby improve the adhesion between the wires and resilient material as well as to improve the tensile and compression stress characteristics of the wires. The amplitude of the undulations may be perpendicular to the direction in which the groups are spaced from each other. The undulations may also be periodic with the phase of such undulations being either the same or different between adjacent groups.

18 Claims, 3 Drawing Figures

REINFORCEMENT OF RESILIENT ARTICLES

This invention relates to the reinforcement of articles made of resilient material such as rubber or plastics, e.g. tyres, conveyor belts, transmission belts and high pressure hoses, and is a modification or improvement of the invention the subject of U.S. Pat. No. 3,957,091.

It is known to reinforce such articles with strands consisting of a number of wires, or with cords consisting of a number of such strands. Various methods of producing such strands and cords exist: the wires may be unreeled from stationary or rotating bobbins and stranded together, or the wires may be bunched together by means of a rotating head and then coiled as a strand or cord onto a drum.

A disadvantage of such strands or cords is that the wires cross each other at close intervals, making point contacts. Such point contacts are disadvantageous when considering a reinforced manufactured product such as a tyre, since the product may be subjected to many loads varying in magnitude and direction during normal use. This will cause the wires to chafe on one another, or undergo so-called "fretting" which may result in the wires breaking at less than their theoretical tensile strength. In addition, the torsional stresses present in the wire as a result of stranding increase the initial stresses to which the wires are subjected. These factors combined result in a so called "cabling loss" which equals the difference between the theoretical and the actual tensile strength. Moreover, the cost of reinforcement may be high due to the production steps required to form the strands or cables.

It has been proposed to reinforce articles not with strands, but with groups of unstranded wires positioned next to each other. Thus, in U.S. Pat. No. 3,957,091 there is disclosed and claimed a plain weave fabric for reinforcing a resilient material, wherein the warp of the fabric consists of unstranded steel wires held together in groups by the weft of the fabric.

An advantage of employing groups of unstranded wires rather than strands is that the wires of each group make a line contact with one another instead of crossing each other to make point contacts. It will be appreciated though that there may still be a small number of point contacts where wires are displaced and cross each other. In addition, tersional stresses in the wires which would be caused by stranding or cabling are eliminated. The result is more effective and reliable reinforcement.

We have found that the properties of an article reinforced in this manner can be further improved by arranging for the wires to have undulations along their length, for example by crimping the wires. Thus, according to one aspect of the invention, there is provided an article of resilient material reinforced by having embedded therein a plurality of elongate, generally parallel, spaced reinforcing members, each member comprising a group of substantially unstranded wires laid next to each other, at least some of said wires being formed with a set so as to have undulations along their length.

By providing such undulations in the wires, it has been found that the adhesion between the wires and the resilient material is considerably improved, whilst the previous advantages are substantially retained. Moreover, the wires have improved tensile and compression stress characteristics than straight wires. Particularly when subject to violent axial compression stresses, for example of the type which may be encountered in the casings of tyres, straight wires may become separated and dislocated, so that the wires loose contact with adjacent wires. Undulated wires on the other hand are able to absorb such stresses. Moreover it is possible to alter the characteristics of the wires by changing the form of the undulations, i.e. their shape, amplitude, or spacing.

The article may be reinforced by means of a fabric, and thus according to another aspect of the invention there is provided a woven fabric for reinforcing a resilient material, wherein the warp of the fabric consists of substantially unstranded wires held together in spaced groups by the weft of the fabric, at least some of said wires being formed with a set so as to have undulations along their length.

Alternatively, the wires may be directly introduced into the article whilst it is being manufactured, and thus according to a further aspect of the invention there is provided a method of manufacturing a reinforced article of resilient material, including the step of passing directly into said article whilst being formed, a plurality of generally parallel spaced groups of substantially unstranded wires laid next to each other, at least some of said wires being formed with a set so as to have undulations along their length.

The invention also extends to means for carrying out the above described method, and thus according to a particular aspect of the invention there is provided apparatus for manufacturing a reinforced article of resilient material, comprising means for forming resilient material into an article, means for feeding into said article whilst being formed, generally parallel, spaced groups of substantially unstranded wires laid next to each other, and means for crimping at least some of said wires before entering said article so as to have undulations along their length.

The amplitude of the undulations may be perpendicular to the general direction in which the groups are spaced from one another. Thus, in the case of a fabric or a reinforced sheet the undulations are perpendicular thereto.

The wires are typically of steel, and may be coated with brass if desired. For use in reinforcing for example tyres, their diameters are typically in the range of 0.1 mm to 0.5 mm, preferably 0.15 mm to 0.3 mm.

For case of manufacture and to provide uniformity in properties in a reinforced article, preferably each wire is provided with undulations, or at least each wire in a particular group. Moreover, the undulations are advantageously periodic, for example, being sinusoidal or following a triangular wave-form, to provide uniformity in properties along the length of the wires, the period being preferably the same for all the wires to provide uniformity in properties across the article. Sinusoidal undulations are particularly advantageous since the tensile strength of the wires is greater than for undulations having sharp bends, such as those following a triangular wave-form.

The phase of the undulations may be the same for all the wires, or simply the same for all the wires in a particular group in which case the phase may differ between adjacent groups of wires, the difference being preferably regular, for example 180° between any two adjacent groups of wires. Such differences in phase further improve adhesion with the resilient material.

It will be appreciated that, to provide uniformity of properties across a reinforced article, the simplest method is to have constant period undulations as hereinabove mentioned, and constant phase, or at least a very simple phase relationship between adjacent wires and/or groups. However, acceptable results may be obtained if there is a suitable periodic variation across the article of the period and/or phase of the undulations.

In a reinforcing fabric according to the invention, the weft may be made of a suitable synthetic material such as nylon or polyester. The fabric may be formed as a strip with the weft comprising a single filament, or a yarn, passing from side to side of the strip. It should be noted that the weft need not perform any load-bearing function, and may be substantially more flexible than the warp wires. A further advantage of the invention as applied to a fabric is that the undulations may serve to restrict movement of the weft longitudinally of the warp wires.

The undulations may be formed in the wires by any suitable means which will deform the wires beyond their elastic limit so as to leave a set. Thus the means could comprise a pair of gear rollers between which is passed a fabric as shown in U.S. Pat. No. 3,957,091 in the direction of the warp wires, or groups of wires from bobbins. If the phase of the undulations is to vary between adjacent groups, each roller may suitably comprise a plurality of individual gear wheels each arranged to contact a single group, the teeth of which are circumferentially displaced with respect to one another. Thus if the phase variation is to be 180° between adjacent groups of wires, the circumferential displacement between adjacent gear wheels will be one tooth-width.

Three embodiments of the present invention will now be described by way of example with reference to the accompanying drawings in which.

Figure 1:
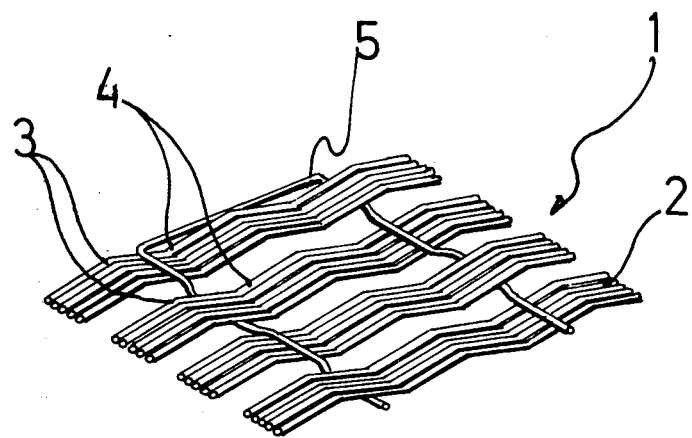
FIG. 1 is a perspective view of one embodiment of a fabric of the present invention.

In FIG. 1 there is shown a portion of a strip of plain weave reinforcing fabric 1 according to the invention, near the edge thereof. The warp of the fabric comprises a plurality of groups 2 of unstranded steel wires. Each group is provided with undulations in a direction generally perpendicular to the general plane of the fabric.

These undulations are periodic, the wires following a generally triangular wave-form so as to have peaks 3 and troughs 4. The period and phase are the same for all the wires, so that all the peaks 3 are aligned, as are the troughs 4.

The weft comprises a yarn or a single filament 5 of nylon or polyester, passing from side to side of the fabric strip.

Figure 2:
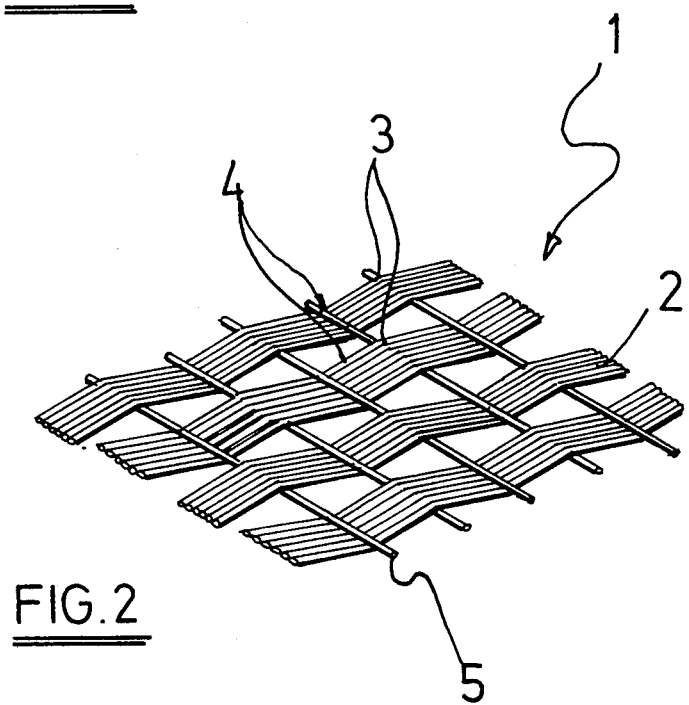
FIG. 2 is a perspective view of a second and preferred embodiment of a fabric of the present invention.

In FIG. 2, there is shown a portion of a fabric similar to that of FIG. 1. However, in this embodiment there is a 180° phase difference between the undulations of adjacent groups of wires, so that the peaks 3 of one group are aligned with the troughs 4 of an adjacent group.

Whilst in the above described embodiments the wires of each group have been shown as lying adjacent one another in a direction parallel to the general plane of the fabric, it will be appreciated that it would be possible to have additional wires superimposed in a direction perpendicular to the general plane of the fabric.

Figure 3:
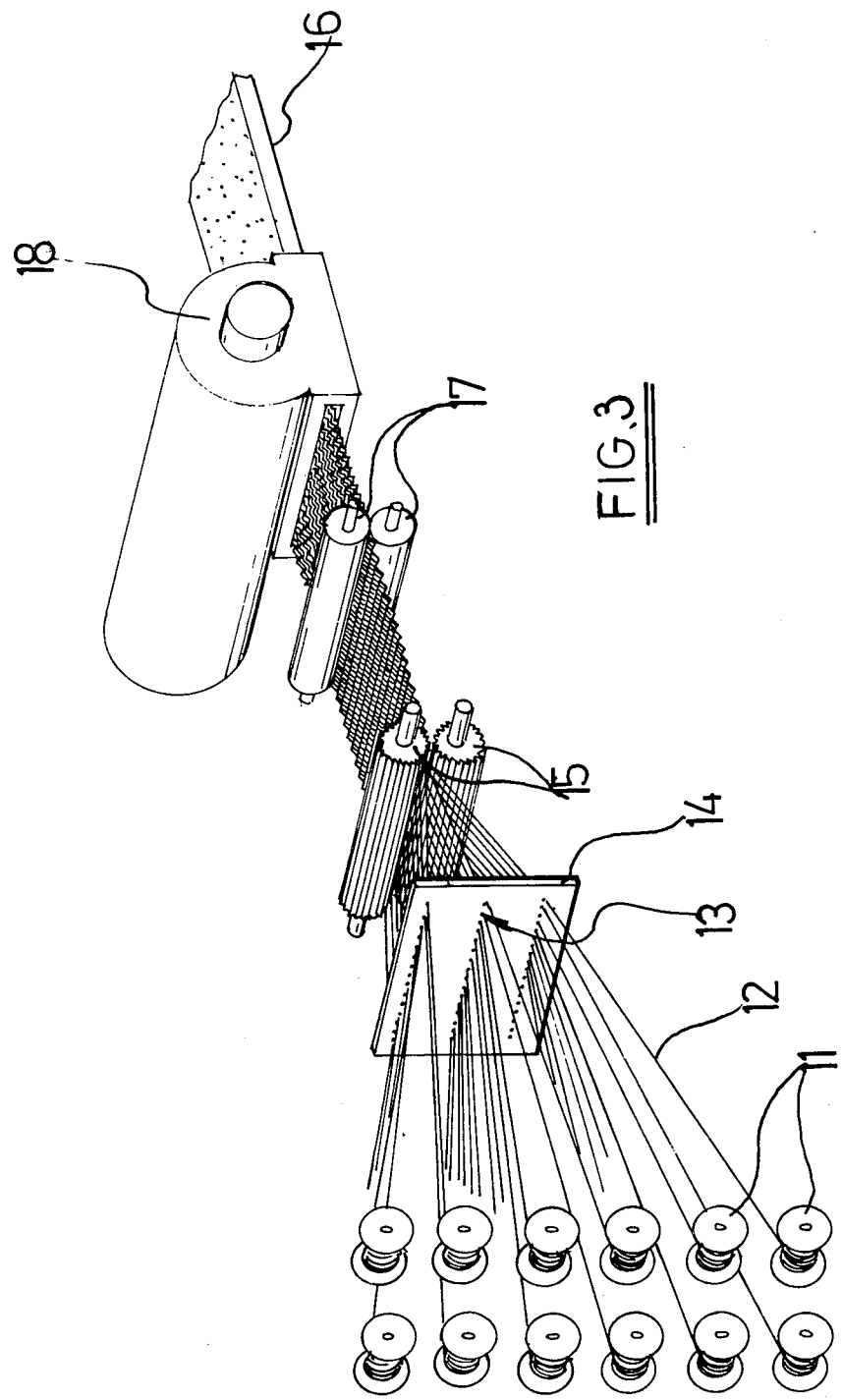
FIG. 3 is a perspective view of apparatus for manufacturing a reinforced article of the present invention.

Referring now to FIG. 3, there is shown apparatus for manufacturing a reinforced article according to the invention, by directly passing wires into the article whilst being formed. A plurality of bobbins 11, forming a creel, are rotatably mounted. These bobbins contain unstranded groups of parallel steel wires 12. The steel wires 12 have a diameter ranging from 0.1 mm to 0.5 mm, preferably ranging from 0.15 mm to 0.3 mm. Each group is passed through an opening 13 in guide plate 4. It is possible to use bobbins on which only one wire is wound, and in this case, the wires of several bobbins, for instance 2 to 7 or even more, are guided through a single opening 13 of the guide plate 14 to form a group.

The groups of steel wires 12 are guided through a pair of gear rollers 15 to crimp the groups. The resultant undulations are periodic, the wires following a generally triangular wave-form so as to have peaks and troughs. It is clear, that by changing the characteristics of the gear rollers 15, it is possible to change the amplitude and the period of the wave form and to give the groups of wires any desired wave-form depending on the desired elongation, compression and tensile strength characteristics of these groups of wires. Preferably, the groups of wires are given a sinusoidal wave-form because in this case the decrease of the tensile strength characteristics has the smallest value.

When the crimped groups of wires leave the gear rollers 15, they can be directly incorporated or embedded in the usual manner in a rubber or plastics article such as a ply 16 whilst being formed by means of an extruding or calendering machine 18. However, it is also possible to place between the gear rollers 15 and the extruding machine a set of flat rollers 17 to reorient the wires of the groups so that they are turned over by an angle of 90°, whereby the wave forms are not perpendicular but parallel to the upper and lower planes of the ply to be formed. In this way, it is possible to form very thin sheets or plies 16.

Although as above described the process is carried out in a continuous manner, it is also possible to start with bobbins on which groups of already crimped parallel wires are wound, so that the gear rollers 15 can be omitted at the forming stage. Particularly in this case, it may be worthwhile to spirally wrap around the groups of crimped parallel wires a filament with a small diameter, for instance 0.15 mm, with a large pitch to keep the crimped parallel wires together in the same group. This can also be obtained by spraying a settable agglutinant on the crimped parallel wires so that they keep together in groups.

Also, while the invention has been described particularly with reference to groups of completely unstranded crimped wires because in this way no point-contacts are made, it will be understood that it would be possible to strand the bundle of wires with a very large pitch, such as a pitch of 40 mm or more, so that wires twisted in this manner or with such a large pitch can be considered to be substantially parallel to one another, and unstranded.

What we claim is:

1. A woven fabric for reinforcing a resilient material, wherein the warp of the fabric consists of substantially unstranded wires held together in spaced groups by the weft of the fabric, at least some of said wires being formed with a set so as to have undulations along their length, and wherein the amplitude of the undulations along their length, and wherein the amplitude of the undulations is substantialy perpendicular to the general plane of the fabric.

2. A fabric as claimed in claim 1 wherein the fabric is in form of a strip and the weft is constituted by a single filament passing from side to side of the strip.

3. A fabric as claimed in claim 1 wherein the fabric is in the form of a strip and the weft is constituted by a yarn passing from side to side of the strip.

4. A fabric as claimed in claim 1 wherein the weft is made from a synthetic material.

5. A fabric as claimed in claim 4 wherein the weft is nylon or polyester.

6. A fabric as claimed in claim 1 wherein the amplitude of the undulations is perpendicular to the general direction in which the groups are spaced from one another.

7. A fabric as claimed in claim 1 wherein the phase of the undulations is constant within any one group.

8. A fabric as claimed in claim 7 wherein each group consists of wires provided with the said undulations.

9. A fabric as claimed in claim 8 wherein the phase of the undulations is the same for each group.

10. A fabric as claimed in claim 8 wherein the phase of the undulations differs between adjacent groups.

11. A fabric as claimed in claim 10 wherein the phase difference between any two adjacent groups is 180°.

12. A fabric as claimed in claim 1 wherein the undulations are periodic.

13. A fabric as claimed in claim 12 wherein the period is the same for all the undulated wires.

14. A fabric as claimed in claim 12 wherein the undulations follow a triangular wave-form.

15. A fabric as claimed in claim 12 wherein the undulations are sinusoidal.

16. A fabric as claimed in claim 1 wherein the wires of each group lie side by side in a direction parallel to the general direction in which the groups are spaced from another.

17. A woven fabric for reinforcing a resilient material, wherein the warp of the fabric consists of substantially unstranded wires held together in spaced groups by the weft of the fabric, at least some of said wires being formed with a set so as to have undulations along their length, wherein the amplitude of the undulations is substantially perpendicular to the general plane of the fabric and wherein the phase of the undulations differs between adjacent groups.

18. A woven fabric for reinforcing a resilient material, wherein the warp of the fabric consists of substantially unstranded wires held together in spaced groups by the weft of the fabric, at least some of said wires being formed with a set so as to have undulations along their length, wherein the amplitude of the undulations is substantially perpendicular to the general plane of the fabric and wherein the phase difference between any two adjacent groups is substantially 180°.

* * * * *

UNITED STATES PATENT AND TRADEMARK OFFICE
CERTIFICATE OF CORRECTION

PATENT NO. : 4,064,915

DATED : December 27, 1977

INVENTOR(S) : Buyssens, Noel; Verbauwhede, Germain

It is certified that error appears in the above-identified patent and that said Letters Patent are hereby corrected as shown below:

Column 1, line 47, change "tersional" to --torsional--
Column 2, line 47, change "case" to --ease--
Column 4, lines 66-67, delete "along their length, and wherein the amplitude of the undulations"
Column 5, line 2, after "in" insert --the--.

Signed and Sealed this

Twenty-third Day of May 1978

[SEAL]

Attest:

RUTH C. MASON
Attesting Officer

LUTRELLE F. PARKER
Acting Commissioner of Patents and Trademarks